Figure 1:
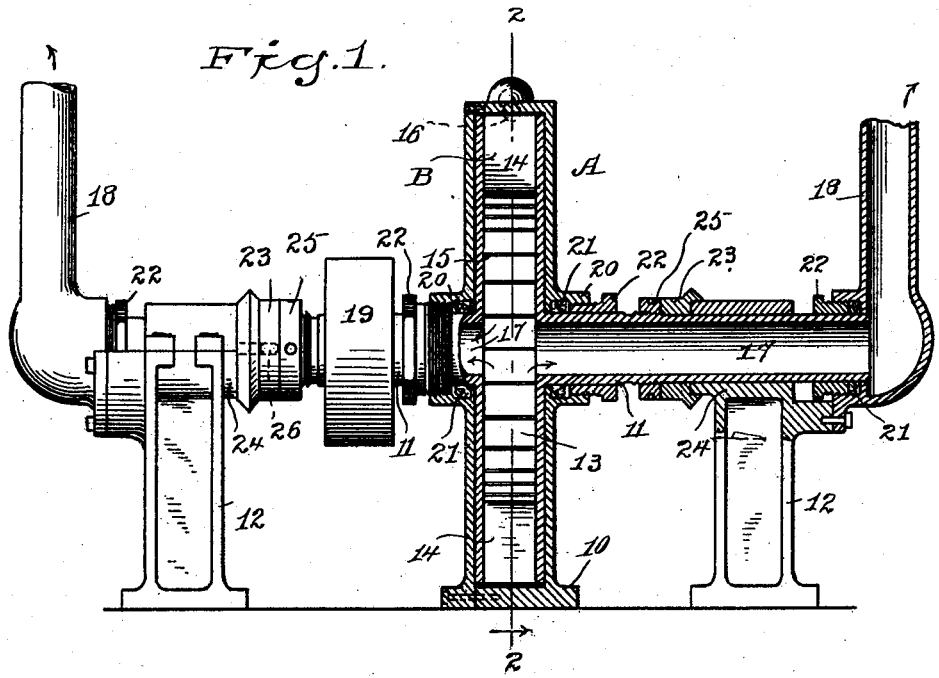

No. 694,101. Patented Feb. 25, 1902.
E. R. HYDE.
ROTARY ENGINE.
(Application filed June 18, 1900.)
(No Model.)

WITNESSES.

INVENTOR.
Elvin R. Hyde

UNITED STATES PATENT OFFICE.

ELWIN R. HYDE, OF BRIDGEPORT, CONNECTICUT.

ROTARY ENGINE.

SPECIFICATION forming part of Letters Patent No. 694,101, dated February 25, 1902.

Application filed June 18, 1900. Serial No. 20,677. (No model.)

*To all whom it may concern:*

Be it known that I, ELWIN R. HYDE, a citizen of the United States, residing at Bridgeport, county of Fairfield, State of Connecticut, have invented a new and useful Rotary Engine, of which the following is a specification.

My invention has for its object to provide an exceedingly simple and inexpensive rotary engine adapted for general uses which shall be so constructed as to utilize the full force of the steam consumed, will prevent any escape of steam except at the exhaust, and will provide a simple adjustment by which the wheel may be centered in the case.

With these ends in view I have devised the simple and novel construction which I will now describe, referring to the accompanying drawings, forming part of this specification, and using reference characters to designate the several parts.

Figure 2:
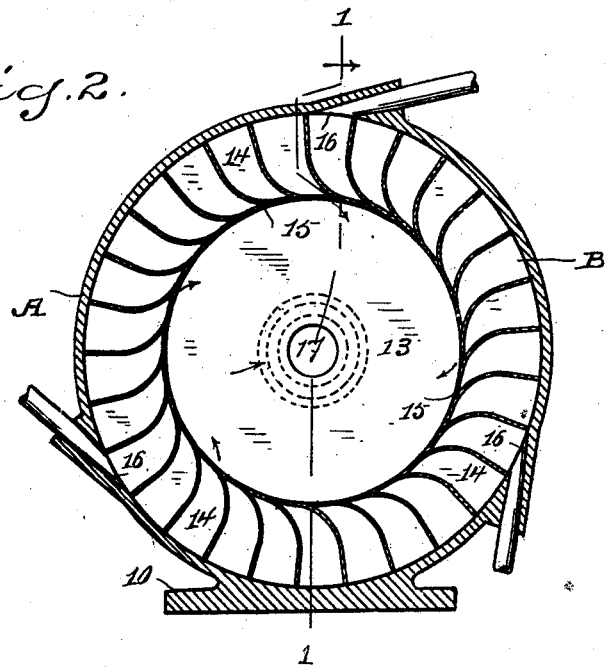

Figure 1 is a view of my novel engine, partly in elevation and partly in longitudinal section, on the line 1 1 in Fig. 2; and Fig. 2 is a transverse section on the line 2 2 in Fig. 1.

A denotes an air-tight case, which may be of any suitable shape or size and is shown as provided with a base 10, upon which it rests. Within the case is a wheel B, having hollow trunnions 11, which are shown as journaled in the walls of the casing and extended through bearings 24 upon standards 12. The essential features of the wheel are an interior steam-space 13, peripheral buckets 14, the shape of which may be varied according to the judgment of the builder and which are provided with relatively small openings 15, through which the steam may pass in a backward direction into the steam-space, and a relatively large exhaust-passage leading from the steam-space through one or both of the hollow trunnions. Steam is taken by means of one or more ports 16, (three being shown in the drawings,) which are preferably placed tangentially, as shown. One or both of the trunnions 11 may be provided with relatively large central openings 17, leading from the steam-space and terminating so that the exhaust may be directly into the air or, if preferred, into a pipe or pipes 18, which may or may not lead to a condenser. (Not shown, as it forms no portion of my invention, an essential feature of my invention being, however, that the exhaust is through the rotary trunnion of the wheel.)

19 denotes a belt-pulley upon one of the trunnions, by means of which power may be communicated to machinery to be driven.

I have shown the case as provided with threaded hubs 20, through which the trunnions pass, each hub being provided with a recess to receive packing 21, which is compressed by means of packing-nuts 22, engaging the threads of the hubs. The trunnions may be moved longitudinally in order to center the wheel in the case by means of nuts 25, engaging threads upon the trunnions and adapted to act upon sleeves 23, which themselves engage the bearings 24, in which the trunnions are journaled, said sleeves being secured to the trunnions by means of pin-and-groove connections, as indicated by dotted lines at 26 in Fig. 1, so as to rotate therewith.

The operation will be readily understood from the drawings. It is obvious that the entire force of the steam which passes into the case must first act upon the wheel through the buckets and can only escape by passing backward through the relatively small openings in the buckets and into the steam-space, from whence it exhausts through the opening 17. By making the port or ports tangential to the wheel I obtain the greatest possible driving effect by the impact of the steam against the forward walls of the buckets and by causing the openings from the buckets into the steam-space to lead backward. I utilize the principle of reaction to drive the wheel forward. It will be noted that the opening in the trunnion through which the steam exhausts is relatively large, so that the steam is not retarded in its escape from the engine after having performed its work.

Having thus described my invention, I claim—

1. The combination with a case having a peripheral steam-port, of a wheel having a shaft comprising hollow trunnions journaled in said case, said wheel having an unobstructed circular central steam-space and peripheral buckets with openings leading to the steam-space, the inner ends of said buckets forming the circle which bounds the steam-space and said shaft having an exhaust-passage leading from said steam-space.

2. The wheel B having an unobstructed circular central steam-space, peripheral buckets having openings leading into said steam-space, the inner ends of said buckets forming the circle which bounds the steam-space and a shaft with an opening leading from said steam-space.

3. An engine comprising a case having a peripheral steam-port and a wheel having an unobstructed circular central steam-space, a hollow trunnion having a central opening leading from said steam-space and peripheral buckets having relatively small openings leading into the steam-space the inner ends of said buckets forming the circle which bounds the steam-space, whereby the force of the steam will first act upon the buckets and the steam then pass through the openings into the steam-space and exhaust through said trunnion.

4. In an engine the combination with a case, of a wheel having hollow trunnions journaled in said case and in bearings 24, longitudinally-movable sleeves keyed to said trunnions and engaging the bearings and nuts upon said trunnions by which the sleeves may be forced against the bearings and the trunnions moved longitudinally to center the wheel in the case.

In testimony whereof I affix my signature in presence of two witnesses.

ELWIN R. HYDE.

Witnesses:
A. W. WOOSTER,
S. M. ATHERTON.